July 22, 1958   C. STEINER   2,844,128
FLUID PRESSURE TORQUE CONVERTER
Filed May 13, 1957   2 Sheets-Sheet 1

INVENTOR.
CARL STEINER
BY
Pyle & Fisher
attys.

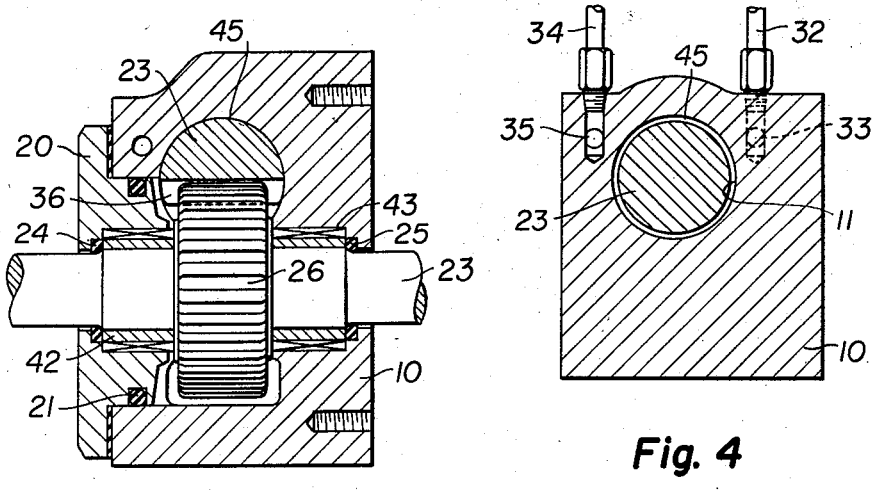
Fig. 3
Fig. 4
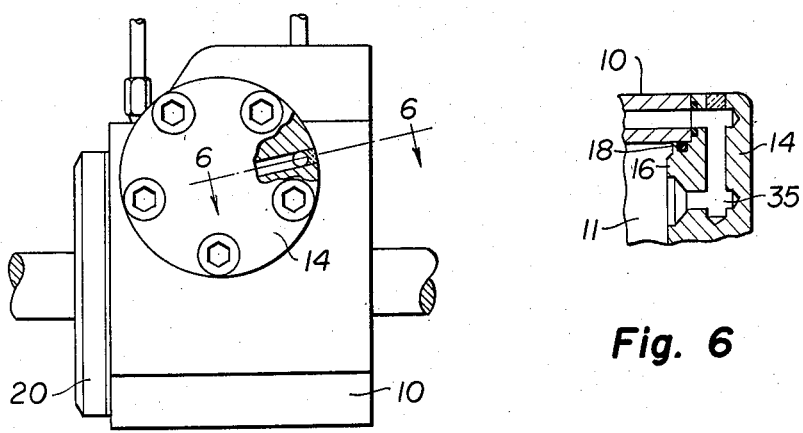
Fig. 5
Fig. 6
INVENTOR.
CARL STEINER

United States Patent Office 2,844,128
Patented July 22, 1958

2,844,128

FLUID PRESSURE TORQUE CONVERTER

Carl Steiner, Orrville, Ohio

Application May 13, 1957, Serial No. 658,631

9 Claims. (Cl. 121—120)

This invention pertains to fluid torque converters and more particularly to a mechanism for converting fluid pressure to selective rotary motion.

This application is a continuation-in-part of United States patent application Number 491,851 filed March 3, 1955, for Fluid Pressure Torque Converter. In that application a balanced torque mechanism for converting fluid pressure to rotary motion is disclosed. The present invention encompasses a single piston device having the patentable features disclosed in that appplication.

In this invention a housing having first and second chambers is formed. The first chamber is a cylinder which carries a reciprocable piston. The piston has a rack formed on it. A shaft is journalled in the housing. The shaft has a gear which interacts with the rack. Fluid passages are provided to conduct fluid selectively to one end or the other of the piston and cause it to reciprocate. The interaction of the rack and gear transforms this reciprocal motion to rotary motion.

In the copending application two pistons are used to provide a balanced torque and avoid distortion and twisting on the journalled shaft. There are, however, additional inventive features disclosed there which substantially reduce frictional loss of the mechanism. These features are operable in a single piston device.

Accordingly, one of the principal objects of the invention is to provide a fluid pressure torque converter having a piston and rack in which the side of the piston opposite the rack cooperates with the piston chamber inner surface to form a bearing. This bearing absorbs lateral thrust transmitted between the rack and gear.

Another object of the invention is to provide a novel and improved fluid pressure torque converter in which combination wiping and sealing rings are carried on either end of the piston. When pressure is applied to one end of the piston the ring on that end serves as a sealing ring while the ring at the other end serves as a wiping ring. Conversely, when pressure is applied to the other end of the piston the said other ring serves as a pressure ring while the one ring serves as a wiping ring.

A further object of the invention is to provide a novel and improved fluid pressure torque converter in which the second chamber and a varying portion of the first chamber intermediate the combination sealing and wiping rings together define a self-agitating reservoir for a lubricant. The combination of a sealed self-agitating lubricant reservoir and the previously described bearing result in reduction in friction, as compared with prior known torque converters.

Still another object of the invention is to provide a novel and improved fluid pressure torque converter having the previously described lubricating reservoir in which any fluid, even such a corrosive substance as salt water, may be used as the activating fluid.

A still further object of the invention is to provide a device wherein the combination rings at opposite ends of the piston serve to back up one another. Most of the wear experienced by the combination wiping and sealing rings will be experienced when the ring is in a sealing position. As the ring wears and begins to leak the leaking pressure will be transmitted to the sealed lubricant. This pressure in turn will be transmitted to the second ring which is then serving as a wiping ring. Since it is in a position of reduced wear it serves as a firm back up for the sealing ring.

A still further object of the invention is to provide a novel and improved torque converter which is both compact and inexpensive to manufacture and which at the same time will permit the use of a high activating fluid pressure.

Still another object of the invention is to provide a novel and improved fluid pressure torque converter which will not permit the migration of and intermingling of fluids and which therefore can be placed in any selected position and held there, under pressure, for an indefinite period of time.

Other objects and a fuller understanding of the invention may be had by referring to the following description and claims, taken in conjunction with the accompanying drawings, in which:

Figure 3 is a cross sectional view of the device as seen from the plane indicated by the line 3—3 of Figure 1;

Figure 4 is a cross sectional view of the device as seen from the plane indicated by the line 4—4 of Figure 1;

Figure 5 is an end elevational view of the device; and,

Figure 6 is a fragmentary sectional view showing the fluid passages through one of the end covers and as seen from the plane indicated by the line 6—6 of Figure 5.

Figure 1:
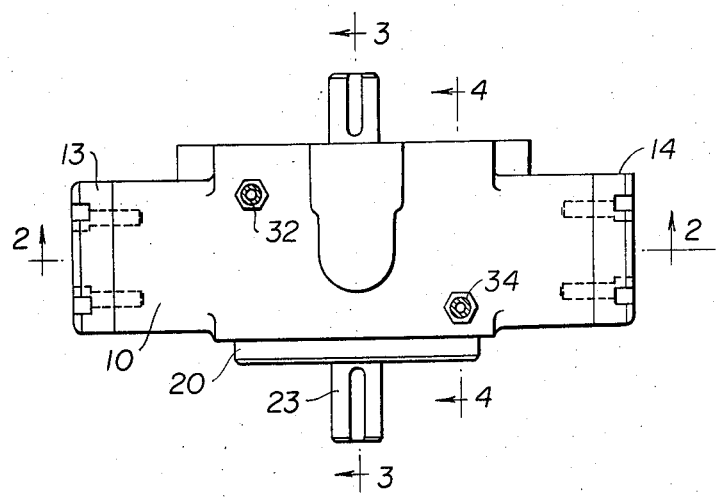
Figure 1 is a top plan view of one of the improved fluid pressure torque converters.

In the drawings a housing is shown at 10. The housing 10 has a first chamber 11 which is a piston chamber. The housing 10 has a second chamber 12 which communicates with the piston chamber 11. The second housing chamber 12 may be referred to as a gear chamber.

First and second end caps 12, 14 are provided. These caps for a part of the housing and serve to seal the ends of the piston chamber 11. The caps 13, 14 have inward extensions 15, 16, respectively. The inward extensions 15, 16 carry O-rings 17, 18 respectively. The O-rings 17, 18 serve as gaskets to seal the chamber 11 which is, in its preferred form, cylindrical.

A front housing closure 20 is also provided. The front housing closure 20 carries a gasket 21 to form a fluid tight seal between the closure 20 and the housing 10. It will be recognized that the closure 20 is in fact, like the caps 13, 14, a portion of the housing.

A shaft 23 is journalled in the housing. Fluid seals 24, 25 are provided to prevent fluid leakage around the shaft. A gear 26 is carried by the shaft 23. The gear 26 is located in the gear chamber 12.

Figure 2:
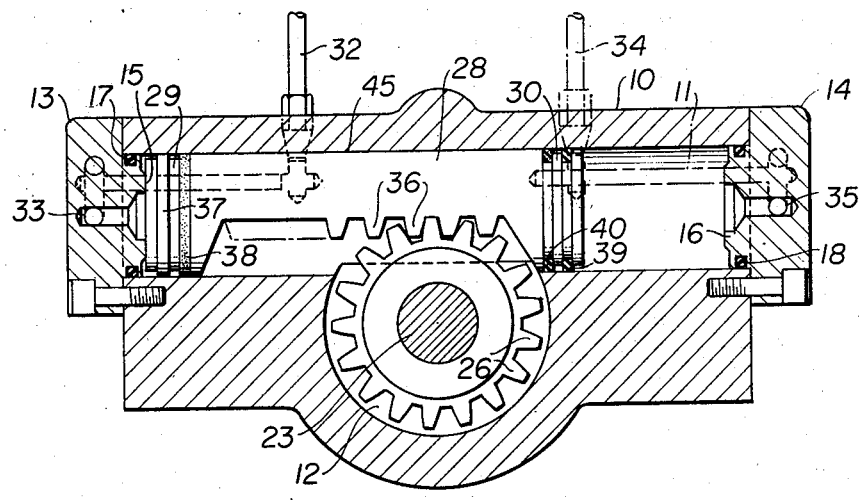
Figure 2 is a cross sectional view as seen from the plane indicated by the line 2—2 of Figure 1.

A piston 28 is carried in the piston chamber 11. The piston has a first end 29 and a second end 30. A fluid supply conduit 32 communicates with fluid passages 33. Fluid under pressure is introduced through the conduit 32 and the passages 33 to coact with the first end 29 of the piston and drive it to the right as seen in Figure 2. A second fluid supply conduit 34 and a second group of fluid passages 35 are provided at the other end of the housing chamber 11. Fluid under pressure is introduced through the fluid supply line 34 and the passages 35 to act against the second piston end 30.

A rack 36 is formed in the piston 28. The rack interacts with the gear 26. A first sealing and wiping ring 37 and a first felt pad 38 are carried at the first end 29 of the piston 28. A second sealing and wiping ring 39 and a second felt pad 40 are carried at the second end 30 of the piston 28.

The gear chamber 12 and a varying portion of the piston chamber 11 between the sealing and wiping rings 37, 39 define a lubricant reservoir. A quantity of lubricant is carried in this reservoir. The lubricant is agitated by reciprocation of the piston whenever the device is in operation. This lubrication of the rack 36 and gear 26 materially reduces the friction and at the same time materially increases the life of the torque converter as compared with prior known devices. The lubricant also lubricates shaft journal bearings 42, 43 which appear in Figure 3.

Another of the advantages of the invention is achieved through the formation of the piston 28 on the side opposite the rack 36 and the corresponding area of the surface of the housing chamber 11. In this region, which is identified by the numeral 45, the surfaces of the housing 11 and the piston 28 are closely and carefully formed to provide a bearing. The ends 29, 30 of the piston are preferably relieved and the entire longitudinal extent of the piston between the rings 37, 39 is utilized for the formation of the bearing. The bearing surfaces at 45 absorb lateral thrust from the inter action of the rack 36 and the gear 26. This bearing 45 is also lubricated by the lubricant in the self-agitating chamber. It will be seen that by forming the rack out of the piston itself and providing the thrust bearing 45 an exceptionally compact, strong, and low friction device is provided.

The novel action of the sealing and wiping O-rings 29, 30 aids in lubricating, preserving, and protecting the bearing 45. The lubricant dispersing pads 38, 40 may also be provided to aid in these functions.

When there is no fluid under pressure in either of the conduits 32, 34 the sealing and wiping rings 37, 39 are in a relaxed condition and in loose contact with the surface of the chamber 11. Referring now to Figure 2, when fluid under pressure is introduced through the conduit 32 the ring 37 will tend to roll up into tight sealing contact with the surface of the chamber 11. When the ring 37 is in its sealing position, the piston 28 moves to the right. As this piston moves to the right the ring 39 will operate as a wiping ring. The ring 39 thus will wipe any foreign materials from the surface of the chamber 11 and any actuating fluid which may be at the right hand end of the chamber 11 will be driven from that chamber. When the piston moves to the left, as seen in Figure 2, the ring 39 will serve as the sealing ring and the ring 37 as the wiping ring.

Another advantage of the invention is achieved from the novel use of the rings 37, 39. The principal wear of the rings 37, 39 is experienced when they are in the sealing position. Thus even should the O-rings begin to leak somewhat after long periods of use, this leakage will be when the rings are subjected to driving pressure. When one ring is in a sealing position the second ring is in a non-worn wiping position. Any leakage pressure will be transmitted by the lubricating medium from the sealing ring to the wiping ring. Thus the wiping ring will serve as a secondary stop or back up.

A torque converter of this disclosed type can be placed in one position and held for long periods of time without slippage or "creep." One of the reasons that this feature is obtained is because of the back up concept provided by the spaced rings 37, 39.

The life of this device is so remarkable that though working models have been available and in use for over two years, no tests have worn the models to an unusable condition. The life of these torque converters can only be measured in terms of millions of cycles.

There has thus been described an improved fluid pressure torque converter having a compact pressure resistant design in which novel two-way sealing and wiping rings are employed, a bearing to absorb lateral thrust is provided, and a self-agitating sealed lubrication chamber is provided.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A torque converter for converting linear to rotary motion comprising, a housing having first and second inner surfaces defining first and second interconnected chambers respectively, a piston carried in the first chamber, a shaft journalled in the housing, a gear carried by the shaft and disposed in the second chamber, said piston having first and second ends, a first seal carried by the piston at its first end, a second seal carried by the piston at its second end, the seals being in slidable contact with said first inner surface, said piston having a rack formed intermediate the seals, the rack and the gear being engaged for the transmission of force from one to the other, fluid tight closure means to close said first chamber, said converter including fluid passages communicating with said first chamber to conduct fluid under pressure to said chamber to cause the piston to reciprocate, said second chamber and a varying portion of said first chamber intermediate the seals together forming a lubricant reservoir, a quantity of lubricant filling said reservoir, the lubricant serving to prevent migration of said fluid for reciprocation into said reservoir and to transmit pressure from one seal to the other seal such that said other seal is a back up for said one seal, and said piston having a surface opposite said rack forming a bearing surface to absorb thrust from the interaction of said rack and said gear.

2. A torque converter for converting linear to rotary motion comprising, a housing having first and second inner surfaces defining first and second interconnected chambers respectively, a piston carried in the first chamber, a shaft journalled in the housing, a gear carried by the shaft and disposed in the second chamber, said piston having first and second ends, a first seal carried by the piston at its first end, a second seal carried by the piston at its second end, the seals being in slidable contact with said first inner surface, said piston having a rack formed intermediate the seals, the rack and the gear being engaged for the transmission of force from one to the other, fluid tight closure means to close said first chamber, said converter including fluid passages communicating with said first chamber to conduct fluid under pressure to said chamber to cause the piston to reciprocate, said second chamber and a varying portion of said first chamber intermediate the seals together forming a lubricant reservoir, a quantity of lubricant filling said reservoir, the lubricant serving to prevent migration of said fluid for reciprocation into said reservoir and to transmit pressure from one seal to the other seal such that said other seal is a back up for said one seal, and said piston having a surface opposite said rack forming a bearing surface to absorb thrust from the interaction of said rack and said gear, said bearing surface having a contour conforming to the contour of an interacting portion of said housing first inner surface, said bearing surface having a longitudinal dimension which is substantially equal to the longitudinal dimension of said varying portion of said lubricant reservoir.

3. A torque converter comprising, a housing having first and second interconnected chambers, a shaft journalled in the housing, a gear carried by the shaft and disposed in said first chamber, said second chamber having first and second ends and having a cylindrical surface, a piston carried in said second chamber, the piston having first and second ends, a first O-ring carried by the piston at its first end, a second O-ring carried by the piston at its second end, the O-rings being in sliding contact with the chamber surface, a rack intermediate the O-rings to reciprocate with said piston, the rack and the gear being intermeshed, a first fluid passage communicating with said second chamber first end, a second fluid passage communicating with said second chamber second end, said passages being for the selective conduction of fluid under pressure to cause said piston to reciprocate, said first chamber and a varying portion of said second chamber intermediate the O-rings being a lubrication chamber, a quantity of lubricant in the chamber, said second O-ring being a wiping and back-up ring and said first O-ring a pressure ring when fluid under pressure is introduced at said first piston end, said first O-ring being a wiping and back-up ring and said second O-ring a pressure ring when fluid under pressure is introduced at said second piston end, and said lubricant being a pressure transmitting medium to conduct pressure from the pressure ring to the back-up ring, whereby to provide a device in which a lubricant is constantly agitated when the device is in operation and in which the lubricant serves the dual function of lubricating the rack and gear and transmitting leakage pressure from seepage past one O-ring to the other O-ring to cause said other O-ring to serve as a backup and thereby inhibit leakage and fluid migration.

4. A torque converter comprising, a housing having first and second interconnected chambers, a shaft journalled in the housing, a gear carried by the shaft and disposed in said first chamber, said second chamber having first and second ends and having a cylindrical surface, a piston carried in said second chamber, the piston having first and second ends, a first O-ring carried by the piston at its first end, a second O-ring carried by the piston at its second end, the O-rings being in sliding contact with the chamber surface, a rack intermediate the O-rings to reciprocate with said piston, the rack and the gear being intermeshed, said piston having a cylindrically contoured bearing surface of substantially semi-circular cross section formed opposite the rack, said bearing surface cooperating with said second chamber surface to form a bearing to absorb thrust transmitted between said rack and gear, a first fluid passage communicating with said second chamber first end, a second fluid passage communicating with said second chamber second end, said passages being for the selective conduction of fluid under pressure to cause said piston to reciprocate, said first chamber and a varying portion of said second chamber intermediate the O-rings being a lubrication chamber for containment of a gear lubricant, and a quantity of lubricant in said lubrication chamber, said lubricant also being a pressure transmitting fluid to transmit pressure from one O-ring to the other, whereby to provide a device in which a lubricant is constantly agitated when the device is in operation and in which the lubricant serves the dual function of lubricating the bearing, the rack and gear and transmitting leakage pressure from seepage past one O-ring to the other O-ring to cause said other O-ring to serve as a backup and thereby inhibit leakage and fluid migration.

5. A torque converter for converting fluid pressure to selective rotary motion comprising, a housing having first and second chambers, said first chamber having first and second ends, a piston reciprocally carried in the first chamber, the piston having first and second ends, the torque converter having first and second fluid passages, said first fluid passages being in communication with the first chamber first end for selective conduction of fluid to act on the piston first end to drive the piston toward the first chamber second end, said second fluid passages being in communication with said first chamber second end for selective conduction of fluid under pressure to act on the piston second end to drive the piston toward the first chamber first end, first and second combination sealing, wiping and back up rings, the first ring being carried on the piston first end, the second ring being carried on the piston second end, said first ring being a sealing ring and said second ring a wiping back up ring when fluid under pressure introduced through said first passage acts on said piston first end, said first ring being a wiping back up ring and said second ring being a sealing ring when fluid is introduced through said second passage to act on the piston second end, said piston having a rack formed between the first and second rings, a shaft and gear member journalled in the housing, the gear being carried in said second chamber and intermeshed with said rack, said second chamber and a varying portion of said first chamber between said first and second rings being a self-agitating lubrication chamber, closure means coacting with said housing to seal said chambers, and a quantity of lubricant in the chambers, said lubricant also being a pressure transmitting fluid to transmit fluid pressure from the pressure ring to the back-up ring.

6. A torque converter for converting fluid pressure to selective rotary motion comprising, a housing having first and second chambers, said first chamber having first and second ends, a piston reciprocally carried in the first chamber, the piston having first and second ends, the torque converter having first and second fluid passages, said first fluid passages being in communication with the first chamber first end for selective conduction of fluid to act on the piston first end to drive the piston toward the first chamber second end, said second fluid passages being in communication with said first chamber second end for selective conduction of fluid under pressure to act on the piston second end to drive the piston toward the first chamber first end, first and second combination sealing, wiping and back-up rings, the first ring being carried on the piston first end, the second ring being carried on the piston second end, said first ring being a sealing ring and said second ring a wiping and back up ring when fluid under pressure introduced through said first passage acts on said piston first end, said first ring being a wiping back up ring and said second ring being a sealing ring when fluid is introduced through said second passage to act on the piston second end, said piston having a rack formed between the first and second rings, a shaft and gear member journalled in the housing, the gear being carried in said second chamber and intermeshed with said rack, said piston having a smooth surface on the side opposite said rack, said first chamber having a smooth inner surface complemental to said piston surface, said piston and chamber surfaces forming a bearing to absorb lateral thrust when the device is in operation, said second chamber and a varying portion of said first chamber between said first and second rings being a self-agitating lubrication chamber, closure means coacting with said housing to seal said chambers, and a quantity of lubricant in the chambers, said lubricant also being a pressure transmitting fluid to transmit fluid pressure from the pressure ring to the back-up ring.

7. A torque converter for converting fluid pressure to selective rotary motion comprising, a housing having first and second chambers, said first chamber having first and second ends, a piston reciprocally carried in the first chamber, the piston having first and second ends, the torque converter having first and second fluid passages, said first fluid passages being in communication with the first chamber first end for selective conduction of fluid to act on the piston first end to drive the piston toward the first chamber second end, said second fluid passages being in communication with said first chamber second end for selective conduction of fluid under pressure to act on the piston second end to drive the piston toward the first chamber first end, first and second combination sealing, wiping back up rings, the first ring being carried on the piston first end, said first ring being a wiping back up ring ond end, said first ring being a sealing ring and said second ring a wiping back up ring when fluid under pressure introduced through said first passage acts on said piston first end, said first end ring being a wiping back up ring and said second ring being a sealing ring when fluid is introduced through said second passage to act on the piston second end, said piston having a rack formed between the first and second rings, a shaft and gear member journalled in the housing, the gear being carried in said second chamber and intermeshed with said rack, said piston having a smooth surface on the side opposite said rack, said piston surface extending substantially from said first to said second ring, said first chamber having a smooth inner surface complemental to said piston surface, said piston and chamber surfaces forming a bearing to absorb lateral thrust when the device is in operation, said second chamber and a varying portion of said first chamber between said first and second rings being a self-agitating lubrication chamber, closure means coacting with said housing to seal said chambers, and a quantity of lubricant in the chambers, said lubricant also being a pressure transmitting fluid to transmit fluid pressure from the pressure ring to the back-up ring.

8. A torque converter or converting fluid pressure to selective rotary motion comprising, a housing having first and second chambers, said first chamber having first and second ends, a piston reciprocally carried in the first chamber, the piston having first and second ends, the torque converter having first and second fluid passages, said first fluid passages being in communication with the first chamber first end for selective conduction of fluid to act on the piston first end to drive the piston toward the first chamber second end, said second fluid passages being in communication with said first chamber second end for selective conduction of fluid under pressure to act on the piston second end to drive the piston toward the first chamber first end, first and second O-rings, first and second annular wiper pads, the first ring and the first pad being carried on the piston first end, the second ring and the second pad being carried on the piston second end, the pads being interposed between the rings, said first ring being a sealing ring and said second ring a wiping back up ring when fluid under pressure introduced through said first passage acts on said piston first end, said first ring being a wiping back up ring and said second ring being a sealing ring when fluid is introduced through said second passage to act on the piston second end, said piston having a rack formed between the first and second rings, a shaft and gear member journalled in the housing, the gear being carried in said second chamber and intermeshed with said rack, said second chamber and a varying portion of said first chamber between said first and second rings being a self-agitating lubrication chamber, closure means coacting with said housing to seal said chambers, and a quantity of lubricant in the chambers, said lubricant also being a pressure transmitting fluid to transmit fluid pressure from the pressure ring to the back-up ring.

9. A torque converter for converting linear to rotary motion comprising, a housing having first and second inner surfaces defining first and second interconnected chambers respectively, a piston carried in the first chamber, a shaft journalled in the housing, a gear carried by the shaft and disposed in the second chamber, said piston having first and second ends, said piston having a first annular groove formed peripherally adjacent the first end, said piston having a second annular groove formed peripherally adjacent the second end, the piston having a first reduced diameter portion interposed between the piston first end and the first groove, the piston having a second reduced diameter portion interposed between the second groove and the second end, the piston having a bearing portion between the grooves, the reduced diameter portions each having a diameter greater than the diameter of each of the grooves and less than the diameter of the bearing portion, a first seal carried by the piston in the first groove, a second seal carried by the piston in the second groove, the seals being in slidable contact with said first inner surface, said piston having a rack formed intermediate the seals and in the bearing portion, the rack and the gear being engaged for the transmission of force from one to the other, fluid tight closure means to close said first chamber, said converter including fluid passages communicating with said first chamber to conduct fluid under pressure to said chamber to cause the piston to reciprocate, said second chamber and a varying portion of said first chamber intermediate the seals together forming a self-agitating lubricant reservoir, a quantity of lubricant filling said reservoir, the lubricant serving to prevent migration of said fluid for reciprocation into said reservoir and to transmit pressure from one seal to the other seal that said other seal is a back up for said one seal, and said piston having a surface opposite said rack and in said bearing portion forming a bearing surface to interact with said first inner surface to absorb lateral thrust from the interaction of said rack and said gear.

References Cited in the file of this patent

UNITED STATES PATENTS

| | | |
|---|---|---|
| 2,491,375 | Hardy | Dec. 13, 1949 |
| 2,515,037 | Hardy | July 11, 1950 |
| 2,588,166 | Sacchini | Mar. 4, 1952 |
| 2,649,077 | Mehm | Aug. 18, 1953 |